(12) United States Patent
Tan et al.

(10) Patent No.: US 11,015,153 B2
(45) Date of Patent: May 25, 2021

(54) UNITARY LAUNDRY DETERGENT ARTICLE

(71) Applicant: The Procter & Gamble Company, Cincinnati, OH (US)

(72) Inventors: Hongsing Tan, Beijing (CN); Mark Robert Sivik, Mason, OH (US); Frank William Denome, Cincinnati, OH (US); Na Hou, Beijing (CN); Min Mao, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 97 days.

(21) Appl. No.: 16/253,246

(22) Filed: Jan. 22, 2019

(65) Prior Publication Data

US 2019/0233779 A1  Aug. 1, 2019

(30) Foreign Application Priority Data

Jan. 26, 2018 (WO) ............... PCT/CN2018/074282

(51) Int. Cl.
| | |
|---|---|
| *C11D 17/06* | (2006.01) |
| *C11D 17/04* | (2006.01) |
| *C11D 3/37* | (2006.01) |
| *C11D 3/22* | (2006.01) |
| *C11D 3/40* | (2006.01) |
| *C11D 3/42* | (2006.01) |
| *C11D 1/22* | (2006.01) |
| *C11D 11/00* | (2006.01) |
| *C09B 29/01* | (2006.01) |
| *C09B 35/04* | (2006.01) |
| *C11D 1/14* | (2006.01) |
| *C11D 1/24* | (2006.01) |

(52) U.S. Cl.
CPC ........ *C11D 17/042* (2013.01); *C09B 29/0003* (2013.01); *C09B 35/04* (2013.01); *C11D 1/146* (2013.01); *C11D 1/22* (2013.01); *C11D 1/24* (2013.01); *C11D 3/3707* (2013.01); *C11D 3/3753* (2013.01); *C11D 3/40* (2013.01); *C11D 3/42* (2013.01); *C11D 11/0017* (2013.01); *C11D 17/06* (2013.01)

(58) Field of Classification Search
None
See application file for complete search history.

(56) References Cited

U.S. PATENT DOCUMENTS

| | | | |
|---|---|---|---|
| 6,462,007 | B1 | 10/2002 | Pieroni et al. |
| 6,555,509 | B2 | 4/2003 | Abbas et al. |

(Continued)

FOREIGN PATENT DOCUMENTS

| | | |
|---|---|---|
| CN | 106916659 A | 7/2017 |
| CN | 106833918 B | 8/2020 |

(Continued)

OTHER PUBLICATIONS

PCT Search Report for appl. No. PCT/CN2018/074282, dated Oct. 22, 2018, 5 pages.

*Primary Examiner* — Lorna M Douyon
(74) *Attorney, Agent, or Firm* — Andrés E. Velarde

(57) ABSTRACT

A water-soluble unitary laundry detergent article that contains two or more surfactant-containing non-fibrous sheets with a fabric hueing agent located between such non-fibrous sheets.

14 Claims, 2 Drawing Sheets

(56) References Cited

U.S. PATENT DOCUMENTS

| | | | | |
|---|---|---|---|---|
| 2011/0136719 A1* | 6/2011 | Jalbert | ................ | C11D 3/3753 |
| | | | | 510/298 |
| 2016/0312158 A1* | 10/2016 | Miracle | ................ | C11D 17/043 |
| 2018/0223230 A1* | 8/2018 | Tan | ..................... | C11D 11/0017 |
| 2019/0093057 A1* | 3/2019 | Tan | ........................ | C11D 17/06 |

FOREIGN PATENT DOCUMENTS

| | | |
|---|---|---|
| EP | 0999262 A1 | 5/2000 |
| EP | 2195410 B1 | 7/2016 |
| WO | 2009047127A1 A1 | 4/2009 |

\* cited by examiner

UNITARY LAUNDRY DETERGENT ARTICLE

FIELD OF THE INVENTION

This invention relates to a unitary laundry detergent article that is water-soluble.

BACKGROUND OF THE INVENTION

Sheet-like laundry detergent articles that are completely or substantially soluble in water have been known in the art. They are easier to handle than both powder and liquid laundry detergents. In contrast with powder laundry detergents, which can easily be spilled during use or can absorb moisture from the ambient air to form clumps (i.e., caking), these laundry detergent sheets have an integral or unitary article that significantly lowers the risk of spillage or caking. Unlike liquid laundry detergent, these laundry detergent sheets contain little or no water. Consequently, they are extremely concentrated and are much easier to transport and handle, with little or no risk of leakage. Further, they are chemically and physically stable during shipment and storage, and have a significantly smaller physical and environmental footprint. In recent years, these sheet-like laundry detergent articles have made significant progress in various aspects, including increased surfactant contents by employing polyvinyl alcohol (PVA) as the main film former and improved processing efficiency by employing a rotating drum drying process. Consequently, they have become more and more commercially available and popular among consumers.

Incorporation of shading or hueing agents into the conventional powder and liquid laundry detergents laundry detergent compositions for improving the aesthetic appearance of treated fabrics has also been known. Such fabric hueing agents impart to the treated fabrics a slightly colored hue or shade, e.g., a green, blue or violet hue, that can effectively increase the apparent whiteness of such treated fabrics and renders them aesthetically more pleasing to the eyes of the consumers than fabrics without such hue.

However, incorporation of fabric hueing agents into the new sheet-like laundry detergent articles may present certain unique aesthetic and technical challenges. For example, most currently in-market sheet-like laundry detergent products incorporate fabric hueing agents uniformly throughout, and the resulting products unavoidably are imparted with a green, blue or violet color that is characteristics of the fabric hueing agents they incorporate. If the amount of fabric hueing agents incorporated reaches a certain level, the product color may become too dark for the consumers' liking, especially for Asian consumers who may perceive dark-colored detergent products as containing more chemicals and therefore more unnatural or harsher. Further, because the fabric hueing agents may result in undesirable staining of the fabrics treated (also referred to as "spotting"), it is also necessary to limit and carefully control the total amount of such fabric hueing agent incorporated into the sheet-like laundry detergent products.

There is therefore a need for sheet-like laundry detergent articles that can freely incorporate fabric hueing agents in sufficient amounts to effectively improve the aesthetic appearance of the treated fabrics, but without the above-mentioned negative impact on the overall appearance of the sheet-like laundry detergent products and/or with little or no staining/spotting of the treated fabrics.

SUMMARY OF THE INVENTION

The present invention provides a unitary laundry detergent article that is water-soluble, which contains at least one fabric hueing agent that is sandwiched between two or more surfactant-containing non-fibrous sheets. Such a unitary laundry detergent article allows more fabric hueing agent to be incorporated with little or no negative impact on the overall product appearance. Further, fabric staining or spotting is surprisingly and unexpected reduced when the fabric hueing agent is sandwiched between the surfactant-containing non-fibrous sheets, in comparison with when the fabric hueing agent is not so sandwiched.

In one aspect, the present invention relates to a unitary laundry detergent structure comprising two or more non-fibrous sheets and at least one fabric hueing agent disposed between such two or more non-fibrous sheets, while such unitary laundry detergent structure is water-soluble, and while each of the two or more non-fibrous sheets comprises at least one film former and a first surfactant. Preferably, each of such non-fibrous sheets has a thickness ranging from about 0.1 mm to about 10 mm, a length-to-thickness aspect ratio of at least about 5:1, and a width-to-thickness aspect ratio of at least about 5:1.

The fabric hueing agent can be present in any form or structure, as long as it is located between the two or more surfactant-containing non-fibrous sheets. For example, it can be directly applied to one or more inner surfaces of the two or more non-fibrous sheets. For another example, it can be present in: (a) a water-soluble fibrous structure disposed between such two or more non-fibrous sheets; (b) a water-soluble non-fibrous sheet structure disposed between such two or more non-fibrous sheets; (c) a water-soluble pasty structure disposed between such two or more non-fibrous sheets; (d) discrete water-soluble particles disposed between such two or more non-fibrous sheets; or (e) combinations thereof.

Preferably but not necessarily, the fabric hueing agent is present in a water-soluble fibrous structure that is disposed between the above-mentioned two or more non-fibrous sheets, while such water-soluble fibrous structure comprises a plurality of fibrous elements that each comprises from about 0.01% to about 30%, preferably from about 0.05% to about 20%, more preferably from about 0.1% to about 15%, most preferably from about 0.5% to about 10% of the fabric hueing agent by total dry weight of such each fibrous element. Each of the fibrous element may further comprise from about 10% to about 90%, preferably from about 20% to about 80%, more preferably from about 30% to about 70% of a filament-forming material. Exemplary filament-forming materials may be selected from the group consisting of polyvinyl alcohols, starch, cellulosic polymers, polyethylene oxides, and combination thereof.

The fabric hueing agent of the present invention may be selected from the group consisting of dyes, dye-clay conjugates, organic pigments, inorganic pigments, optical brighteners, and combinations thereof. Preferably, the fabric hueing agent is a fabric hueing dye. Exemplary fabric hueing dyes may include, but are not limited to, direct dyes, basic dyes, reactive dyes, solvent dyes, disperse dyes, and combinations thereof.

In a particularly preferred embodiment of the present invention, the fabric hueing agent has a chemical structure of:

(a)

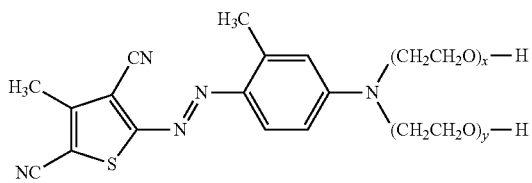

wherein the index values x and y are independently selected from 1 to 10; or (b)

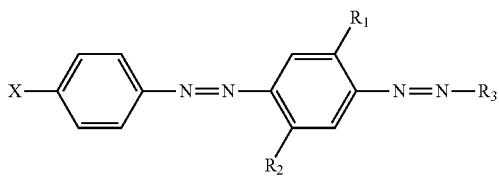

wherein: R1 and R2 are independently selected from the group consisting of: H; alkyl; alkoxy; alkyleneoxy; alkyl capped alkyleneoxy; urea; and amido; R3 is a substituted aryl group; X is a substituted group comprising sulfonamide moiety and optionally an alkyl and/or aryl moiety, and wherein the substituent group comprises at least one alkyleneoxy chain that comprises an average molar distribution of at least four alkyleneoxy moieties.

Alternatively, the fabric hueing agent may be an optical brightener. Exemplary optical brighteners may include, but are not limited to diaminostilbenes, distyrylbiphenyls, and combinations thereof. Preferably, the optical brightener is selected from the group consisting of: (1) disodium 4,4'-bis{[4-anilino-6-morpholino-s-triazin-2-yl]-amino}-2,2'-stilbenedisulfonate; (2) disodium 4,4"-bis[(4,6-di-anilino-s-triazin-2-yl)-amino]-2,2'-stilbenedisulfonate; (3) disodium 4,4'-bis{[4-anilino-6-[bis(2-hydroxyethyl)amino-s-triazin-2-yl]-amino}-2,2'-stilbenedisulfonate; (4) disodium 2,2'-([1,1'-biphenyl]-4,4'-diyldi-2,1-ethenesulfonate; and (5) combinations thereof. More preferably, the optical brightener is disodium 2,2'-([1,1'-biphenyl]-4,4'-diyldi-2,1-ethenediyl)bis-benzenesulfonate.

Preferably, each of the above-mentioned two or more non-fibrous sheets contains: (1) from about 5 wt % to about 90 wt %, preferably from about 20% to about 90%, more preferably from about 30% to about 90%, most preferably from about 50% to about 90% of the first surfactant as mentioned hereinabove, by total weight of such each non-fibrous sheet, and (2) from about 1% to about 70%, preferably from about 2% to about 60%, more preferably from about 5% to about 50%, most preferably from about 10% to about 40% of the at least one film former as mentioned hereinabove, by total weight of such each non-fibrous sheet. More preferably, the first surfactant is present as the main surfactant in each of the two or more non-fibrous sheets.

The first surfactant in the above-mentioned two or more non-fibrous sheets is preferably characterized by a Hydrophilic Index (HI) of no more than 7.5. Exemplary first surfactants for practice of the present invention may include, but are not limited to: $C_6$-$C_{20}$ linear alkylbenzene sulfonates (LAS), $C_6$-$C_{20}$ linear or branched alkyl sulfates (AS), and a combination thereof. Preferably, the first surfactant is an unalkoxylated $C_6$-$C_{18}$ linear or branched AS surfactant, more preferably an unalkoxylated $C_{12}$-$C_{14}$ linear or branched AS surfactant.

The at least one film former in the two or more non-fibrous sheets is preferably a water-soluble polymer. Exemplary water-soluble polymers that can be used in the present invention include, but are not limited to: polyvinyl alcohols, polyalkylene glycols, starch or modified starch, cellulose or modified cellulose, polyacrylates, polymethacrylates, polyacrylamides, polyvinylpyrrolidones, and combinations thereof; and wherein more preferably said water-soluble polymer is selected from the group consisting of polyvinyl alcohols, polyalkylene glycols, and combinations thereof. Preferably, the at least one film former in each of the two or more non-fibrous sheets is a polyvinyl alcohol that is characterized by: (1) a weight average molecular weight ranging from 10,000 to 140,000 Daltons, preferably from about 15,000 to about 120,000 Daltons; and/or (2) a degree of hydrolysis ranging from about 40% to about 100%, preferably from about 50% to about 95%, more preferably from about 70% to about 92%.

Another aspect of the present invention relates to use of the above-mentioned unitary laundry detergent article for pre-treating and/or cleaning fabrics. Preferably, the pre-treating and/or cleaning is carried out by wetting a section of the fabrics in need of pre-treating and/or cleaning, and then directly contacting at least a portion of the unitary laundry detergent article with such wetted section of the fabrics.

These and other aspects of the present invention will become more apparent upon reading the following detailed description of the invention.

DETAILED DESCRIPTION OF THE INVENTION

Figure 1:
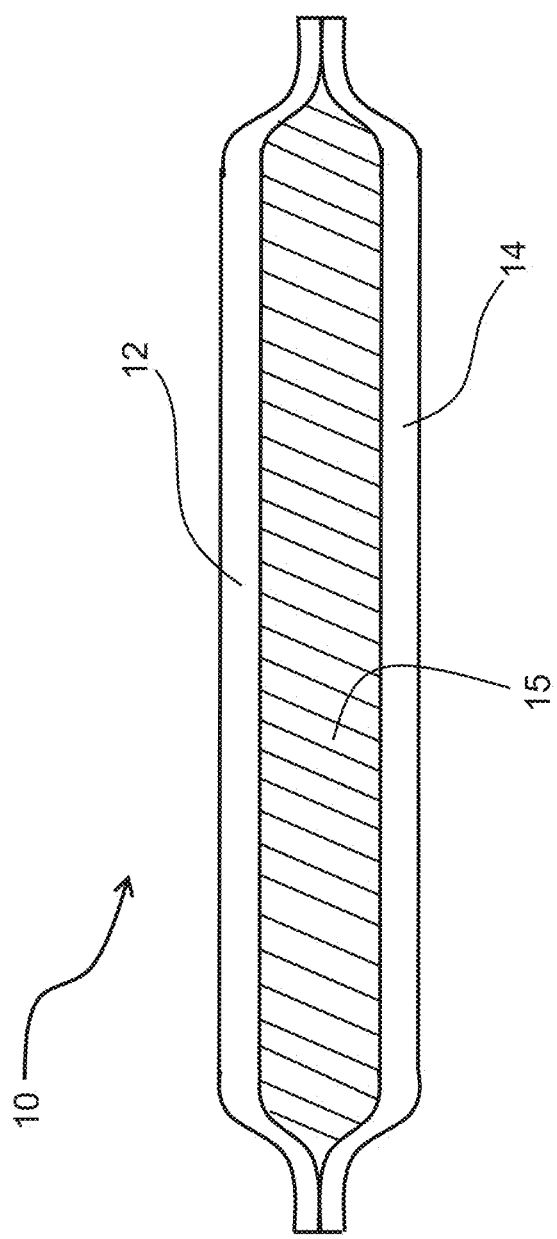
FIG. 1 is a schematic cross-sectional view of a unitary laundry detergent article comprising a fabric hueing agent sandwiched between two surfactant-containing non-fibrous sheets, according to one embodiment of the present invention.

Features and benefits of the various embodiments of the present invention will become apparent from the following description, which includes examples of specific embodiments intended to give a broad representation of the invention. Various modifications will be apparent to those skilled in the art from this description and from practice of the invention. The scope of the present invention is not intended to be limited to the particular forms disclosed and the invention covers all modifications, equivalents, and alternatives falling within the spirit and scope of the invention as defined by the claims.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

As used herein, articles such as "a" and "an" when used in a claim, are understood to mean one or more of what is claimed or described. The terms "comprise," "comprises," "comprising," "contain," "contains," "containing," "include," "includes" and "including" are all meant to be non-limiting.

As used herein, the term "unitary" refers to a structure containing a plurality of distinctive parts that are combined together to form a visually coherent and structurally integral article.

As used herein, the term "non-fibrous" refers to a structure that is free of or substantially free of fibrous elements. The terms "Fibrous element" and "filaments" are used interchangeably here to refer to elongated particles having a length greatly exceeding its average cross-sectional diameter, i.e., a length-to-diameter aspect ratio of at least 10:1, and preferably such elongated particles have an average cross-sectional diameter of no more than 1 mm.

As used herein, the term "sheet" refers to a three-dimensional shape having a thickness, a length, and a width, while the length-to-thickness aspect ratio and the width-to-thickness aspect ratio are both at least about 5:1, and the length-to-width aspect ratio is at least about 1:1. Preferably, the length-to-thickness aspect ratio and the width-to-thickness aspect ratio are both at least about 10:1, and the length-to-width aspect ratio is at least about 1.2:1. More preferably, the length-to-thickness aspect ratio and the width-to-thickness aspect ratio are both at least about 15:1, and the length-to-width aspect ratio is at least about 1.5:1. Most preferably, the length-to-thickness aspect ratio and the width-to-thickness aspect ratio are both at least about 20:1, and the length-to-width aspect ratio is at least about 1.618:1.

As used herein, the term "discrete" refers to particles that are structurally distinctive from each other either under naked human eyes or under electronic imaging devices, such as scanning electron microscope (SEM) and transmission electron microscope (TEM). Preferably, the discrete particles of the present invention are structurally distinctive from each other under naked human eyes.

As used herein, the term "particle" refers to a solid matter of minute quantity, such as a powder, granule, encapsulate, microcapsule, and/or prill. The particles of the present invention can be spheres, rods, plates, tubes, squares, rectangles, discs, stars or flakes of regular or irregular shapes, but they are non-fibrous. The particles of the present invention may have a median particle size of 2000 μm or less, as measured according to the Median Particle Size Test described herein. Preferably, the particles of the present invention have a median particle size ranging from about 1 μm to about 2000 μm, more preferably from about 10 μm to about 1800 μm, still more preferably from about 50 μm to about 1700 μm, still more preferably from about 100 μm to about 1500 μm, still more preferably from about 250 μm to about 1000 μm, most preferably from about 300 μm to about 800 μm, as measured according to the Median Particle Size Test described herein.

As used herein, the term "water-soluble" refers to the ability of a sample material to completely dissolve in or disperse into water leaving no visible solids or forming no visibly separate phase, when at least about 25 grams, preferably at least about 50 grams, more preferably at least about 100 grams, most preferably at least about 150 grams, of such material is placed in one liter (1 L) of deionized water at 20° C. and under the atmospheric pressure with sufficient stirring.

As used herein, "Hydrophilic Index" or "HI" of a surfactant is calculated by the following equation:

$$HI = \frac{M_h}{M_T} \times 20$$

wherein $M_h$ is the molecular weight of all hydrophilic groups in the surfactant, wherein $M_T$ is the total molecular weight of the surfactant. Both $M_h$ and $M_T$ refer to weight average molecular weights. For example, linear alkylbenzene sulfonate with an average alkyl chain length of about 11.8 has a HI value of about 4.97. For another example, $C_{12}$-$C_{14}$ alkyl sulfate has a HI value of about 6.98. For yet another example, $C_{12}$-$C_{14}$ alkylethoxylated sulfate with an average ethoxylation degree of about 1 has a HI value of about 8.78, and $C_{12}$-$C_{14}$ alkylethoxylated sulfate with an average ethoxylation degree of about 3 has a HI value of about 11.57. For still another example, $C_{14}$-$C_{15}$ alkylethoxylated alcohol with an average ethoxylation degree of about 7 has a HI value of about 12.73, and $C_{12}$-$C_{14}$ alkylethoxylated alcohol with an average ethoxylation degree of about 9 has a HI value of about 14.72.

As used herein, the term "main surfactant" refers to a surfactant which is present in an article at an amount of 50% or more, by total weight of all surfactants in such article.

As used herein, the terms "consisting essentially of" means that the composition contains no ingredient that will interfere with benefits or functions of those ingredients that are explicitly disclosed. Further, the term "substantially free of" or "substantially free from" means that the indicated material is present in the amount of from 0 wt % to about 5 wt %, preferably from 0 wt % to 3 wt %. The term "essentially free of" means that the indicated material is present in the amount of from 0 wt % to about 1 wt %, preferably from 0 wt % to about 0.5 wt %, more preferably from 0 wt % to about 0.1 wt %, most preferably it is not present at analytically detectable levels.

As used herein, all concentrations and ratios are on a weight basis unless otherwise specified. All temperatures herein are in degrees Celsius (° C.) unless otherwise indicated. All conditions herein are at 20° C. and under the atmospheric pressure, unless otherwise specifically stated. All polymer molecular weights are determined by weight average number molecular weight unless otherwise specifically noted.

Non-Fibrous Sheets

The non-fibrous sheets used for holding or containing the fabric hueing agent in the unitary laundry detergent article of the present invention are water-soluble. In other words, they do not contain any water-insoluble substrate, as some of the conventional laundry detergent sheets do.

Each of such non-fibrous sheets contain at least one film former and a first surfactant. The first surfactant has a relatively low hydrophilicity (in comparison with the second surfactant contained by the discrete particles) and is characterized by a Hydrophilic Index (HI) of no more than 7.5. Such a first surfactant is less likely to form a viscous, gel-like hexagonal phase while being diluted, in comparison with the second surfactant that will be discussed hereinafter. Therefore, by using such a first surfactant in forming the non-fibrous sheets, the present invention can effectively reduce gel-formation during wash, which in turn leads to fast dissolution and low or no undissolvable residues of the resulting unitary laundry detergent structure.

The non-fibrous sheets can have any shape or size, so long as its thickness, its length, and its width are characterized by: (1) a length-to-thickness aspect ratio of at least about 5:1, (2) a width-to-thickness aspect ratio of at least about 5:1, and (3) a length-to-width aspect ratio of at least about 1:1. All the ensuing size- and/or shape-related parameters for the unitary laundry detergent article also apply to each of the non-fibrous sheets.

Each of such non-fibrous sheets is characterized by a sufficiently high total surfactant content, e.g., at least about 30%, preferably at least about 40%, more preferably at least about 50%, more preferably at least about 60%, and most preferably at least about 70%, by total weight of such non-fibrous sheet.

Preferably, the first surfactant as mentioned hereinabove is the main surfactant in each of the non-fibrous sheets, i.e., it is present at an amount of about 50% or more, by total weight of all surfactants in such sheet. The first surfactant is characterized by a HI of no more than about 7.5, and preferably from about 4 to 7.5, and more preferably from 4.5 to 7.

Suitable surfactants for use as the first surfactant in the present invention include unalkoxylated $C_6$-$C_{20}$ linear or branched alkyl sulfates (AS), $C_6$-$C_{20}$ linear alkylbenzene sulfonates (LAS), and combinations thereof. A particularly preferred type of surfactants for use as the first surfactant in the non-fibrous sheets of the present invention are unalkoxylated $C_6$-$C_{18}$ AS, which are referred to as "mid-cut AS" hereinafter, while each of which has a branched or linear unalkoxylated alkyl group containing from about 6 to about 18 carbon atoms. In a particularly preferred embodiment of the present invention, the mid-cut AS is present as the main surfactant in the non-fibrous sheet, i.e., it is present in an amount that is at least about 50% by total weight of all surfactants in the sheet, while another surfactant, such as LAS, are present as a co-surfactant.

The mid-cut AS of the present invention has the generic formula of R—O—SO$_3^-$M$^+$, while R is branched or linear unalkoxylated $C_6$-$C_{18}$ alkyl group, and M is a cation of alkali metal, alkaline earth metal or ammonium. Preferably, the R group of the AS surfactant contains from about 8 to about 16 carbon atoms, more preferably from about 10 to about 14 carbon atoms, and most preferably from about 12 to about 14 carbon atoms. R can be substituted or unsubstituted, and is preferably unsubstituted. R is substantially free of any alkoxylation. M is preferably a cationic of sodium, potassium, or magnesium, and more preferably M is a sodium cation.

The amount of mid-cut AS surfactants used in the present invention may range from about 5% to about 90%, preferably from about 10% to about 80%, more preferably from about 20% to about 75%, and most preferably from about 30% to about 70%, by total weight of each of such two or more non-fibrous sheets. Such mid-cut AS surfactant(s) preferably functions as the main surfactant in the surfactant system of each of the sheets. In other words, the mid-cut AS surfactant(s) are present in an amount of greater than 50% by total weight of all surfactants in each of the non-fibrous sheets.

Preferably, the surfactant system of the sheets may contain a mixture of mid-cut AS surfactants comprising more than about 50 wt %, preferably more than about 60 wt %, more preferably more than 70 wt % or 80 wt %, and most preferably more than 90 wt % or even at 100 wt % (i.e., substantially pure), of linear AS surfactants having an even number of carbon atoms, including, for example, $C_6$, $C_8$, $C_{10}$, $C_{12}$, $C_{14}$, $C_{16}$, and $C_{18}$ AS surfactants.

More preferably, the surfactant system of the sheets contains a mixture of mid-cut AS surfactants, in which $C_6$-$C_{14}$ AS surfactants are present in an amount ranging from about 85% to about 100% by total weight of the mixture. This mixture can be referred to as a "$C_6$-$C_{14}$-rich AS mixture." More preferably, such $C_6$-$C_{14}$-rich AS mixture contains from about 90 wt % to about 100 wt %, or from 92 wt % to about 98 wt %, or from about 94 wt % to about 96 wt %, or 100 wt % (i.e., pure), of $C_6$-$C_{14}$ AS.

In a particularly preferred embodiment of the present invention, the surfactant system contains a mixture of mid-cut AS surfactants comprising from about 30 wt % to about 100 wt % or from about 50 wt % to about 99 wt %, preferably from about 60 wt % to about 95 wt %, more preferably from about 65 wt % to about 90 wt %, and most preferably from about 70 wt % to about 80 wt % of $C_{12}$-$C_{14}$ AS, which can be referred to as a "$C_{12}$-$C_{14}$-rich AS mixture." Preferably, such $C_{12}$-$C_{14}$-rich AS mixture contains a majority of $C_{12}$ AS. In a most preferred embodiment of the present invention, the surfactant system contains a mixture of mid-cut AS surfactants that consist of $C_{12}$ and/or $C_{14}$ AS surfactants, e.g., 100% $C_{12}$ AS or from about 70 wt % to about 80 wt % of $C_{12}$ AS and from 20 wt % to about 30 wt % of $C_{14}$ AS, with little or no other AS surfactants therein.

In a most preferred embodiment of the present invention, each of the non-fibrous sheets contains from about 10 wt % to about 70 wt %, preferably from about 20 wt % to about 60 wt %, of pure $C_{12}$ AS or a $C_{12}$-$C_{14}$-rich AS mixture by total weight of such non-fibrous sheet, while the $C_{12}$-$C_{14}$-rich AS mixture contains from about 70 wt % to about 80 wt % of $C_{12}$ AS and from 20 wt % to about 30 wt % of $C_{14}$ AS by total weight of such mixture.

A commercially available mid-cut AS mixture particularly suitable for practice of the present invention is Texapon® V95 G from Cognis (Monheim, Germany).

Another preferred type of surfactants for use as the first surfactant in the non-fibrous sheets of the present invention are $C_6$-$C_{20}$ linear alkylbenzene sulfonates (LAS), which may be present in the sheets either alone or in combination with the mid-cut AS described hereinabove. LAS can either be present as a main surfactant, or as a co-surfactant for the mid-cut AS, in the non-fibrous sheets. In a particularly preferred embodiment of the present invention, LAS is present in the non-fibrous sheets as a co-surfactant for the mid-cut AS, for example, in a weight ratio ranging from about 1:15 to about 1:2, preferably from about 1:10 to about 1:3, and more preferably from about 1:8 to about 1:4.

LAS surfactants are well known in the art and can be readily obtained by sulfonating commercially available linear alkylbenzenes. Exemplary $C_6$-$C_{20}$ linear alkylbenzene sulfonates that can be used in the present invention include alkali metal, alkaline earth metal or ammonium salts of $C_6$-$C_{20}$ linear alkylbenzene sulfonic acids, and preferably the sodium, potassium, magnesium and/or ammonium salts of $C_{11}$-$C_{18}$ is or $C_{11}$-$C_{14}$ linear alkylbenzene sulfonic acids. More preferred are the sodium or potassium salts of $C_{12}$ linear alkylbenzene sulfonic acids, and most preferred is the sodium salt of $C_{12}$ linear alkylbenzene sulfonic acid, i.e., sodium dodecylbenzene sulfonate. If present, the amount of LAS in the non-fibrous sheets may range from about 1% to about 90%, preferably from about 2% to about 70%, and more preferably from about 5% to about 40%, by total weight of each of the non-fibrous sheets. In a most preferred embodiment of the present invention, each of the non-fibrous sheets contains from about 5% to about 20% of a sodium, potassium, or magnesium salt of $C_{12}$ linear alkylbenzene sulfonic acid, by total weight of such each non-fibrous sheet.

The non-fibrous sheets of the present invention may each comprise at least one additional surfactant selected from the group consisting of other anionic surfactants (i.e., other than AS and LAS), nonionic surfactants, zwitterionic surfactants, amphoteric surfactants, cationic surfactants, and combinations thereof.

Other anionic surfactants suitable for inclusion into the non-fibrous sheets of the present invention include $C_6$-$C_{20}$ linear or branched alkyl sulfonates, $C_6$-$C_{20}$ linear or branched alkyl carboxylates, $C_6$-$C_{20}$ linear or branched alkyl phosphates, $C_6$-$C_{20}$ linear or branched alkyl phosphonates, $C_6$-$C_{20}$ alkyl N-methyl glucose amides, $C_6$-$C_{20}$ methyl ester sulfonates (MES), and combinations thereof.

Suitable nonionic surfactants include alkoxylated fatty alcohols. The nonionic surfactant may be selected from ethoxylated alcohols and ethoxylated alkyl phenols of the formula $R(OC_2H_4)_nOH$, wherein R is selected from the group consisting of aliphatic hydrocarbon radicals containing from about 8 to about 15 carbon atoms and alkyl phenyl radicals in which the alkyl groups contain from about 8 to about 12 carbon atoms, and the average value of n is from about 5 to about 15. Non-limiting examples of nonionic surfactants useful herein include: $C_8$-$C_{18}$ alkyl ethoxylates, such as, NEODOL® nonionic surfactants from Shell; $C_6$-$C_{12}$ alkyl phenol alkoxylates where the alkoxylate units may be ethyleneoxy units, propyleneoxy units, or a mixture thereof; $C_{12}$-$C_{18}$ alcohol and $C_6$-$C_{12}$ alkyl phenol condensates with ethylene oxide/propylene oxide block polymers such as Pluronic® from BASF; $C_{14}$-$C_{22}$ mid-chain branched alcohols, BA; $C_{14}$-$C_{22}$ mid-chain branched alkyl alkoxylates, $BAE_x$, wherein x is from 1 to 30; alkylpolysaccharides; specifically alkylpolyglycosides; polyhydroxy fatty acid amides; and ether capped poly(oxyalkylated) alcohol surfactants. Suitable nonionic detersive surfactants also include alkyl polyglucoside and alkyl alkoxylated alcohol. Suitable nonionic surfactants also include those sold under the tradename Lutensol® from BASF.

Non-limiting examples of cationic surfactants include: the quaternary ammonium surfactants, which can have up to 26 carbon atoms include: alkoxylate quaternary ammonium (AQA) surfactants; dimethyl hydroxyethyl quaternary ammonium; dimethyl hydroxyethyl lauryl ammonium chloride; polyamine cationic surfactants; cationic ester surfactants; and amino surfactants, e.g., amido propyldimethyl amine (APA). Suitable cationic detersive surfactants also include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, for example chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-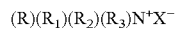alkyl mono-hydroxyethyl di-methyl quaternary ammonium chloride and mono-$C_{10}$ alkyl mono-hydroxyethyl di-methyl quaternary ammonium chloride.

Suitable examples of zwitterionic surfactants include: derivatives of secondary and tertiary amines, including derivatives of heterocyclic secondary and tertiary amines; derivatives of quaternary ammonium, quaternary phosphonium or tertiary sulfonium compounds; betaines, including alkyl dimethyl betaine, cocodimethyl amidopropyl betaine, and sulfo and hydroxy betaines; $C_8$ to $C_{18}$ (preferably from $C_{12}$ to $C_{18}$) amine oxides; N-alkyl-N,N-dimethylammino-1-propane sulfonate, where the alkyl group can be $C_8$ to $C_{18}$.

Suitable amphoteric surfactants include aliphatic derivatives of secondary or tertiary amines, or aliphatic derivatives of heterocyclic secondary and tertiary amines in which the aliphatic radical may be straight or branched-chain and where one of the aliphatic substituents contains at least about 8 carbon atoms, or from about 8 to about 18 carbon atoms, and at least one of the aliphatic substituents contains an anionic water-solubilizing group, e.g. carboxy, sulfonate, sulfate. Suitable amphoteric surfactants also include sarcosinates, glycinates, taurinates, and mixtures thereof.

In a particularly preferred but not necessary embodiment of the present invention, the non-fibrous sheet may have a surfactant system containing only anionic surfactants, e.g., either a single anionic surfactant or a combination of two or more different anionic surfactants. Alternatively, the non-fibrous sheets may include a composite surfactant system, e.g., containing a combination of one or more anionic surfactants with one or more nonionic surfactants, or a combination of one or more anionic surfactants with one or more zwitterionic surfactants, or a combination of one or more anionic surfactants with one or more amphoteric surfactants, or a combination of one or more anionic surfactants with one or more cationic surfactants, or a combination of all the above-mentioned types of surfactants (i.e., anionic, nonionic, amphoteric and cationic).

Particularly, each of the non-fibrous sheets may comprise a small amount of surfactant(s) with a relatively high hydrophilicity (in comparison with the first surfactant mentioned hereinabove) characterized by a Hydrophilic Index (HI) of more than 7.5, i.e., the second surfactant(s) as described hereinafter. The amount of such second surfactant in each of the non-fibrous sheets is sufficiently small so as not to affect the processing stability and film dissolution thereof, e.g., from 0% to 15%, preferably from 0% to 10%, more preferably from 0% to 5%, most preferably from 0% to 1% by total weight of such each non-fibrous sheet. In a preferred embodiment of the present invention, each of the non-fibrous sheets is substantially free of, more preferably essentially free of, alkylalkoxylated sulfates, which are preferred choices for the second surfactant of the present invention. Alkylalkoxylated sulfates, when dissolved in water, may undergo a highly viscous hexagonal phase at certain concentration ranges, e.g., 30-60% by weight, resulting in a gel-like substance. Therefore, if incorporated into the non-fibrous sheets in a significant amount, alkylalkoxylated sulfates may significantly slow down the dissolution of such non-fibrous sheets in water, and worse yet, resulting in undissolved solids afterwards. Correspondingly, the present invention formulates most of such surfactants into fabric hueing agent-containing structures in the middle of the unitary laundry detergent article, instead into the non-fibrous sheets on both sides of such article, which helps to minimize gel-formation by such surfactants, as well as reducing the impact of such gel-formation on dissolution of other ingredients in the unitary laundry detergent article of the present invention.

In addition to the surfactant(s) described hereinabove, each of the non-fibrous sheets contains at least one film former. Such at least one film former can be selected from water-soluble polymers, either synthetic or natural in origin and may be chemically and/or physically modified.

Suitable examples of water-soluble polymers for the practice of the present invention include polyvinyl alcohols, polyalkylene glycols (also referred to as polyalkylene oxides or polyoxyalkylenes), polysaccharides (such as starch or modified starch, cellulose or modified cellulose, pullulan, xanthum gum, guar gum, and carrageenan), polyacrylates, polymethacrylates, polyacrylamides, polyvinylpyrrolidones, and proteins/polypeptides or hydrolyzed products thereof (such as collagen and gelatin). Preferably, the film former to be used in the present invention is selected from the group consisting of polyvinyl alcohols, polyalkylene glycols, starch or modified starch, cellulose or modified cellulose, and combinations thereof. In a particularly preferred embodiment of the present invention, each of the non-fibrous sheets contains polyvinyl alcohol.

In the execution of polyvinyl alcohol (PVA), it may be unmodified or modified, e.g., carboxylated or sulfonated, or it may be a copolymer of vinyl alcohol or vinyl ester monomer with one or more other monomers. Preferably, the PVA is partially or fully alcoholised or hydrolysed. For example, it may be from about 40% to 100%, preferably from about 50% to about 95%, more preferably from about 70% to about 92%, alcoholised or hydrolysed. The degree of hydrolysis is known to influence the temperature at which the PVA starts to dissolve in water, e.g., 88% hydrolysis corresponds to a PVA film soluble in cold (i.e. room temperature) water, whereas 92% hydrolysis corresponds to a PVA film soluble in warm water. The weight average molecular weight of PVA may range from 10,000 to 140,000 Daltons, preferably from 15,000 to 120,000 Daltons. An example of preferred PVA is ethoxylated PVA. A more preferred example of PVA is commercially available from Sekisui Specialty Chemicals America, LLC (Dallas, Tex.) under the tradename CELVOL®. Another more preferred example of PVA is the so-called G Polymer commercially available Nippon Ghosei.

In the execution of polyalkylene glycols, preferably polyethylene glycols (PEG), they may be selected from poly(ethylene glycol) homopolymers and poly(ethylene glycol) copolymers having a weight average molecular weight of between about 200 and about 100,000 Daltons, preferably between about 500 and about 20,000 Daltons, more preferably from about 1000 to 15,000 Daltons, and most preferably from 2000 to 8000 Daltons. Suitable poly(ethylene glycol) copolymers preferably contain at least about 50 wt % of PEG and may be selected from the group consisting of poly(lactide-block-ethylene glycol), poly(glycolide-block-ethylene glycol), poly(lactide-co-caprolactone)-block-poly(ethylene glycol), poly(ethylene glycol-co-lactic acid), poly(ethylene glycol-co-glycolic acid), poly(ethylene glycol-co-poly(lactic acid-co-glycolic acid), poly(ethylene glycol-co-propylene glycol), poly(ethylene oxide-block-propylene oxide-block-ethylene oxide), poly(propylene oxide-block-ethylene glycol-block-propylene glycol), and poly(ethylene glycol-co-caprolactone). Exemplary poly(ethylene glycol) homopolymers are commercially available from Sigma Aldrich, or from Dow under the tradename of CARBOWAX™, or from BASF under the tradename of Pluriol®. Exemplary poly(ethylene glycol) copolymers are commercially available from BASF under the tradenames of Pluronic® F127, Pluronic® F108, Pluronic® F68 and Pluronic® P105, which contain propylene oxide (PO) blocks and ethylene oxide (EO) blocks. A particularly preferred PEG for the practice of the present invention is a poly(ethylene glycol) homopolymer having a weight average molecular weight of between about 4000 and about 8000 Daltons.

The film former may be present in the non-fibrous sheets of the present invention at from about 1% to about 70%, preferably from about 2% to about 60%, more preferably from about 5% to about 50%, and most preferably from about 10% to about 40%, by total weight of such each non-fibrous sheets. In a particularly preferred embodiment of the present invention, each of the non-fibrous sheets contains both PVA and PEG, preferably at a weight ratio ranging from about 20:1 to about 1:2 ratio, more preferably from about 15:1 to about 1:1, most preferably from about 10:1 to about 2:1. For example, PVA may be present in the amount ranging from about 10% to about 40%, preferably from 15% to about 30%, and PEG may be present in the amount ranging from about 2% to about 20%, preferably from 5% to 10%, by total weight of such each non-fibrous sheet.

In addition to the film former, the non-fibrous sheets may also comprise suitable additives such as plasticizers and solids, for modifying the properties of the film former. Suitable plasticizers are, for example, pentaerythritols such as dipentaerythritol, sorbitol, mannitol, glycerine and glycols such as glycerol or ethylene glycol. Plasticizers are generally used in an amount of up to about 30 wt %, for example from about 0.1 to about 20 wt %, preferably from about 0.5 to about 15 wt %, more preferably from about 1 to about 5 wt %. Solids such as zeolites, talc, stearic acid, magnesium stearate, silicon dioxide, zinc stearate or colloidal silica may also be used, generally in an amount ranging from about 0.5 to about 5 wt %.

The two or more non-fibrous sheets of the present invention may optionally include one or more other adjunct detergent ingredients for assisting or enhancing cleaning performance, or to modify the aesthetics of the non-fibrous sheet. Illustrative examples of such adjunct detergent ingredients include: (1) inorganic and/or organic builders, such as carbonates (including bicarbonates and sesquicarbonates), sulphates, phosphates (exemplified by the tripolyphosphates, pyrophosphates, and glassy polymeric meta-phosphates), phosphonates, phytic acid, silicates, zeolite, citrates, polycarboxylates and salts thereof (such as mellitic acid, succinic acid, oxydisuccinic acid, polymaleic acid, benzene 1,3,5-tricarboxylic acid, carboxymethyloxysuccinic acid, and soluble salts thereof), ether hydroxypolycarboxylates, copolymers of maleic anhydride with ethylene or vinyl methyl ether, 1,3,5-trihydroxy benzene-2,4,6-trisulphonic acid, 3,3-dicarboxy-4-oxa-1,6-hexanedioates, polyacetic acids (such as ethylenediamine tetraacetic acid and nitrilotriacetic acid) and salts thereof, fatty acids (such as $C_{12}$-$C_{18}$ monocarboxylic acids); (2) chelating agents, such as iron and/or manganese-chelating agents selected from the group consisting of amino carboxylates, amino phosphonates, polyfunctionally-substituted aromatic chelating agents and mixtures therein; (3) clay soil removal/anti-redeposition agents, such as water-soluble ethoxylated amines (particularly ethoxylated tetraethylene-pentamine); (4) polymeric dispersing agents, such as polymeric polycarboxylates and polyethylene glycols, acrylic/maleic-based copolymers and water-soluble salts thereof of, hydroxypropylacrylate, maleic/acrylic/vinyl alcohol terpolymers, polyethylene glycol (PEG), polyaspartates and polyglutamates; (5) optical brighteners, which include but are not limited to derivatives of stilbene, pyrazoline, coumarin, carboxylic acid, methinecyanines, dibenzothiphene-5,5-dioxide, azoles, 5- and 6-membered-ring heterocycles, and the like; (6) suds suppressors, such as monocarboxylic fatty acids and soluble salts thereof, high molecular weight hydrocarbons (e.g., paraffins, haloparaffins, fatty acid esters, fatty acid esters of monovalent alcohols, aliphatic $C_{18}$-$C_{40}$ ketones, etc.), N-alkylated amino triazines, propylene oxide, monostearyl phosphates, silicones or derivatives thereof, secondary alcohols (e.g., 2-alkyl alkanols) and mixtures of such alcohols with silicone oils; (7) suds boosters, such as $C_{10}$-$C_{16}$ alkanolamides, $C_{10}$-$C_{14}$ monoethanol and diethanol amides, high sudsing surfactants (e.g., amine oxides, betaines and sultaines), and soluble magnesium salts (e.g., $MgCl_2$, $MgSO_4$, and the like); (8) fabric softeners, such as smectite clays, amine softeners and cationic softeners; (9) dye transfer inhibiting agents, such as polyvinyl pyrrolidone polymers, polyamine N-oxide polymers, copolymers of N-vinylpyrrolidone and N-vinylimidazole, manganese phthalocyanine, peroxidases, and mixtures thereof; (10) enzymes, such as proteases, amylases, lipases, cellulases, and peroxidases, and mixtures thereof; (11) enzyme stabilizers, which include water-soluble sources of calcium and/or magnesium ions, boric acid or borates (such as boric oxide, borax and other alkali metal borates); (12) bleaching agents, such as percarbonates (e.g., sodium carbonate peroxyhydrate, sodium pyrophosphate peroxyhydrate, urea peroxyhydrate, and sodium peroxide), persulfates, perborates, magnesium monoperoxyphthalate hexahydrate, the magnesium salt of metachloro perbenzoic acid, 4-nonylamino-4-oxoperoxybutyric acid and diperoxydodecanedioic acid, 6-nonylamino-6-oxoperoxycaproic acid, and photoactivated bleaching agents (e.g., sulfonated zinc and/or aluminum phthalocyanines); (13) bleach activators, such as nonanoyloxybenzene sulfonate (NOBS), tetraacetyl ethylene diamine (TAED), amido-derived bleach activators including (6-octanamidocaproyl)oxybenzenesulfonate, (6-nonanamidocaproyl)oxybenzenesulfonate, (6-decanamidocaproyl)oxybenzenesulfonate, and mixtures thereof, benzoxazin-type activators, acyl lactam activators (especially acyl caprolactams and acyl valerolactams); and (14) any other known detergent adjunct ingredients, including but not limited to carriers, hydrotropes, processing aids, dyes or pigments (especially hueing dyes), perfumes (including both neat perfumes and perfume microcapsules), and solid fillers.

The non-fibrous sheets of the present invention can be made by any suitable film-forming method, such as casting, molding, pressing, extrusion/extrusion-coating, calendar rolling, solution deposition, skiving, and lamination. In one specific embodiment, they can be formed by first providing a slurry containing raw materials dissolved or dispersed in water, and then shaping the slurry into a sheet-like form, e.g., by either pouring such slurry into a shallow mold or coating it over a heated rotatable cylinder. Drying of the sheet-like form can be carried out either simultaneously with the shaping step, or subsequently, to remove water and form finished sheets with little or no moisture content (e.g., less than 3 wt % water).

A preferred but non-limiting process for making the above-described non-fibrous sheets is by using a cylinder sheet production system, as described hereinafter. The cylinder sheet production system comprises a base bracket with a heated rotatable cylinder installed thereon. The heated rotatable cylinder can be driven by a motorized drive installed on the base bracket, and work at a predetermined rotation speed. Said heated rotatable cylinder is preferably coated with a non-stick coating on its outer surface.

There is also provided a feeding mechanism on the base bracket, which is for adding a pre-formed slurry containing all or some raw materials described hereinabove (e.g., the surfactant(s), the film former(s), and adjunct detergent ingredients) onto the heated rotatable cylinder. The feeding mechanism includes a feeding rack installed on the base bracket, while said feeding rack has installed thereupon at least one (preferably two) feeding hopper(s), an imaging device for dynamic observation of the feeding, and an adjustment device for adjusting the position and inclination angle of the feeding hopper.

There is also a heating shield installed on the base bracket, to prevent rapid heat lost. Otherwise, the slurry can solidify too quickly on the heated rotatable cylinder. The heating shield can also effectively save energy needed by the heated rotatable cylinder, thereby achieving reduced energy consumption and provide cost savings. The heating shield is a modular assembly structure, or integrated structure, and can be freely detached from the base bracket. A suction device is also installed on the heating shield for sucking the hot steam, to avoid any water condensate falling on the laundry detergent sheet that is being formed. There is also a start feeding mechanism installed on the base bracket, which is for scooping up the laundry detergent sheet already formed by the heated rotatable cylinder.

The making process of the non-fibrous sheets is as follows. Firstly, the heated rotatable cylinder with the non-stick coating on the base bracket is driven by the motorized drive. Next, the adjustment device adjusts the feeding mechanism so that the distance between the feeding hopper and the outer surface of the heated rotatable cylinder reaches a preset value. Meanwhile, the feeding hopper adds the pre-formed slurry containing all or some raw materials for making the non-fibrous sheets onto the heated rotatable cylinder. The suction device of the heating shield sucks the hot steam generated by the heated rotatable cylinder.

Next, the start feeding mechanism scoops up the dried sheets, which can then be sliced or cut into desired sizes by a slicing/cutting device downstream of the heated rotatable cylinder. Optionally, each sheet is further embossed with lines, patterns, logos, etc. by an embossing device downstream of the heated rotatable cylinder.

Fabric Hueing Agent

The fabric hueing agents used in the present invention may be any colorant that can be formulated into a laundry detergent composition to deposit onto fabrics from the wash liquor so as to improve fabric whiteness perception. The fabric hueing agent may be blue or violet in color, and preferably such fabric hueing agent has a peak absorption wavelength of from about 550 nm to about 650 nm, or from about 570 nm to about 630 nm. In a specific embodiment, the fabric hueing agent may be a combination of colorants which together have the visual effect on the human eye as a single colorant having a peak absorption wavelength on polyester of from about 550 nm to about 650 nm, or from about 570 nm to about 630 nm. This may be provided for example by mixing a red colorant and a green-blue colorant to yield a blue or violet shade.

The fabric hueing agents may be selected from the group consisting of dyes, dye-clay conjugates, organic pigments, inorganic pigments, optical brightener, and combinations thereof.

Dyes are typically colored organic molecules which are soluble in aqueous media that contain surfactants (in contrast with pigments which are typically not soluble in aqueous media). Dyes may include small molecule dyes and polymeric dyes.

Suitable small molecule dyes maybe selected from the group consisting of direct dyes, basic dyes, reactive dyes, solvent dyes, disperse dyes, and combinations thereof. More preferably, suitable small molecular dyes may be selected from the group consisting of dyes falling into the Color Index (C.I.) classifications of Direct Blue, Direct Violet, Acid Blue, Acid Violet, Basic Blue, Basic Violet, and mixtures thereof. Examples of suitable dyes are violet DD, Direct Violet 7, Direct Violet 9, Direct Violet 11, Direct Violet 26, Direct Violet 31, Direct Violet 35, Direct Violet 40, Direct Violet 41, Direct Violet 51, Direct Violet 66, Direct Violet 99, Acid Violet 50, Acid Blue 9, Acid Violet 17, Acid Blue 29, Solvent Violet 13, Disperse Violet 27 Disperse Violet 26, Disperse Violet 28, Disperse Violet 63, Disperse Violet 77, Basic Blue 16, Basic Blue 65, Basic Blue 66, Basic Blue 67, Basic Blue 71, Basic Blue 159, Basic Violet 19, Basic Violet 35, Basic Violet 38, Basic Violet 48, Basic Blue 3, Basic Blue 75, Basic Blue 95, Basic Blue 122, Basic Blue 124, Basic Blue 141, Reactive Blue 19, Reactive Blue 163, Reactive Blue 182, Reactive Blue 96, thiazolium dyes, Liquitint® Violet CT (Milliken, Spartanburg, USA) and Azo-CM-Cellulose (Megazyme, Bray, Republic of Ireland). Other suitable hueing agents are hueing dye-photobleach conjugates, such as the conjugate of sulphonated zinc phthalocyanine with Direct Violet 99. A particularly suitable hueing agent is a combination of Acid Red 52 and Acid Blue 80, or the combination of Direct Violet 9 and Solvent Violet 13.

In a particularly preferred embodiment of the present invention, the fabric hueing agent has the following structure:

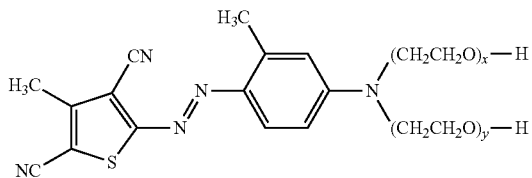

wherein the index values x and y are independently selected from 1 to 10. This fabric hueing agent is commercially available from Milliken Chemical (South Carolina, USA) under the tradename Liquitint Violet 200.

In another preferred embodiment of the present invention, the fabric hueing agent has the following structure:

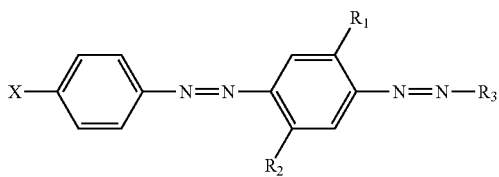

wherein: $R_1$ and $R_2$ are independently selected from the group consisting of: H; alkyl; alkoxy; alkyleneoxy; alkyl capped alkyleneoxy; urea; and amido; $R_3$ is a substituted aryl group; X is a substituted group comprising sulfonamide moiety and optionally an alkyl and/or aryl moiety, and wherein the substituent group comprises at least one alkyleneoxy chain that comprises an average molar distribution of at least four alkyleneoxy moieties.

Optical brighteners are another group of compounds that can be used to achieve fabric hueing benefit, either alone or in combination with the dyes described hereinabove. Suitable optical brighteners include, but are not limited to: diaminostilbenes, distyrylbiphenyls, and combinations thereof. Preferably, such fluorescent dyes are selected from the group consisting of disodium 4,4'-bis{[4-anilino-6-morpholino-s-triazin-2-yl]-amino}-2,2'-stilbenedisulfonate (also referred to as "Fluorescent Brigthener 260"), disodium 4,4''-bis[(4,6-di-anilino-s-triazin-2-yl)-amino]-2,2'-stilbenedisulfonate, disodium 4,4'-bis{[4-anilino-6-[bis(2-hydroxyethyl)amino-s-triazin-2-yl]amino}-2,2'-stilbenedisulfonate, disodium 2,2'-([1,1'-biphenyl]-4,4'diyldivinylene)bis (benzenesulphonate) (also referred to as "Fluorescent Brightener 351"), and combinations thereof. A particularly preferred optical brightener to be incorporated into the unitary laundry detergent article of the present invention is Fluorescent Brightener 351. The optical brightener may be in micronized particulate form, having a weight average particle size in the range of from 3 to 30 micrometers, or from 3 micrometers to 20 micrometers, or from 3 to 10 micrometers. The optical brightener can also be in an alpha or beta crystalline form.

The fabric hueing agent may be directly applied to one or more inner surfaces of the two or more non-fibrous sheets, e.g., by dusting, sprinkling, spraying, coating, or other direct depositing techniques well known in the art. As used therein, the term "inner surface" refers to a surface that is not exposed to external environment when the two or more non-fibrous sheet are assembled into the unitary laundry detergent article of the present invention.

Alternatively, the fabric hueing agent can be first incorporated into a structure, which is then disposed between the two or more non-fibrous sheets. For example, the fabric hueing agent can be incorporated into: (a) a water-soluble fibrous structure; (b) a water-soluble non-fibrous sheet structure; (c) a water-soluble pasty structure; (d) discrete water-soluble particles; or (e) combinations thereof, which is/are then disposed between the two or more sheets.

In a particularly preferred embodiment of the present invention, the fabric hueing agent is present in a water-soluble fibrous structure that is disposed between the abovementioned two or more non-fibrous sheets. The water-soluble fibrous structure may comprise a plurality of fibrous elements that each comprises from about 0.01% to about 30%, preferably from about 0.05% to about 20%, more preferably from about 0.1% to about 15%, most preferably from about 0.5% to about 10% of the fabric hueing agent by total dry weight of such each fibrous element. Each of the fibrous elements may further comprise from about 10% to about 90%, preferably from about 20% to about 80%, more preferably from about 30% to about 70% of a filament-forming material, and wherein preferably said filament-material is selected from the group consisting of polyvinyl alcohols, starch, cellulosic polymers (e.g., carboxymethylcellulose), polyethylene oxides, and combination thereof. The filament-forming material may have a weight average molecular weight ranging from about 50,000 g/mol to about 3,000,000 g/mol. It is believed that in this range, the filament-forming material may provide extensional rheology, without being so elastic that fiber attenuation is inhibited in the fiber-making process. The fibrous element may further comprise a plasticizer, such as glycerin, and/or pH adjusting agents, such as citric acid.

In addition to the fabric hueing agent, each of the fibrous elements may further comprise one or more active agents selected from the group consisting of a second surfactant, a structurant, a builder, a polymeric dispersing agent, an enzyme, an enzyme stabilizer, a bleach system, a brightener, a chelating agent, a suds suppressor, a conditioning agent, a humectant, a perfume, a perfume microcapsule, a filler or carrier, an alkalinity system, a pH control system, a buffer, an alkanolamine, mosquito repellant, and combinations thereof. In one specific and preferred embodiment of the present invention, each of the fibrous elements further comprise a second surfactant, which can be selected from the surfactants as above described for the non-fibrous sheets but which is preferably different from the first surfactant. The fibrous element may comprise two or more different active agents as mentioned hereinabove, which are compatible or incompatible with one another.

In general, fibrous elements or filaments are elongated particles having a length greatly exceeding its average cross-sectional diameter, i.e., a length-to-diameter aspect ratio of at least 10:1. The fibrous element or filament of the present invention preferably has an average cross-sectional diameter of no more than 1 mm, and/or no more than about 300 μm, and/or no more than about 75 μm, and/or no more than about 50 μm, and/or no more than about 25 μm, and/or no more than about 10 μm, and/or no more than about 5 μm, and/or no more than about 1 μm, as measured according to the Diameter Test Method described herein. More preferably, the fibrous element or filament has a length ranging from about 1 cm to about 20 cm, preferably from about 2 cm to about 15 cm, more preferably from about 3 cm to about 10 cm, most preferably from about 5 cm to about 8 cm. The diameter and length of a fibrous element may be used to control the dissolution and/or release rate of the fabric hueing agent and/or of the active agent(s) present therein, and/or the rate of loss and/or altering of the fibrous element's physical structure.

The fabric hueing agent can also be incorporated into or onto discrete water-soluble particles, which are in turn sandwiched between the above-described non-fibrous sheets. Discrete particles suitable for use in the present invention can be any shapes selected from the group consisting of spheres, rods, plates, tubes, squares, rectangles, discs, stars, flakes of regular or irregular shapes, and combinations thereof, as long as they are non-fibrous. They may have a median particle size of 2000 μm or less, as measured according to the Median Particle Size Test described herein. Preferably, such discrete particles have a median particle size ranging from about 1 μm to about 2000 μm, preferably from about 10 μm to about 1800 μm, more preferably from about 50 μm to about 1700 μm, still more preferably from about 100 μm to about 1500 μm, still more preferably from about 250 μm to about 1000 μm, most preferably from about 300 μm to about 800 μm, as measured according to the Median Particle Size Test described herein. The bulk density of such discrete particles may range from 500 g/L to 1000 g/L, preferably from 600 g/L to 900 g/L, more preferably from 700 g/L to 800 g/L.

In addition to the fabric hueing agent, each of the discrete particles may further comprise one or more active agents as described hereinabove for the water-soluble fibrous structure. Still further, the discrete particles of the present invention may optionally include one or more adjunct detergent ingredients for assisting or enhancing cleaning performance or to modify the aesthetics thereof. Illustrative examples of such adjunct detergent ingredients include: (1) rheology modifiers, such as alkoxylated polyalkyleneimines and polyalkylene glycols; (2) inorganic and/or organic builders, such as carbonates (including bicarbonates and sesquicarbonates), sulphates, phosphates (exemplified by the tripolyphosphates, pyrophosphates, and glassy polymeric meta-phosphates), phosphonates, phytic acid, silicates, zeolite, citrates, polycarboxylates and salts thereof (such as mellitic acid, succinic acid, oxydisuccinic acid, polymaleic acid, benzene 1,3,5-tricarboxylic acid, carboxymethyloxysuccinic acid, and soluble salts thereof), ether hydroxypolycarboxylates, copolymers of maleic anhydride with ethylene or vinyl methyl ether, 1,3,5-trihydroxy benzene-2,4,6-trisulphonic acid, 3,3-dicarboxy-4-oxa-1,6-hexanedioates, polyacetic acids (such as ethylenediamine tetraacetic acid and nitrilotriacetic acid) and salts thereof, fatty acids (such as $C_{12}$-$C_{18}$ monocarboxylic acids); (3) chelating agents, such as iron and/or manganese-chelating agents selected from the group consisting of amino carboxylates, amino phosphonates, polyfunctionally-substituted aromatic chelating agents and mixtures therein; (4) clay soil removal/anti-redeposition agents, such as water-soluble ethoxylated amines (particularly ethoxylated tetraethylene-pentamine); (5) polymeric dispersing agents, such as polymeric polycarboxylates, acrylic/maleic-based copolymers and water-soluble salts thereof of, hydroxypropylacrylate, maleic/acrylic/vinyl alcohol terpolymers, polyaspartates and polyglutamates; (6) suds suppressors, such as monocarboxylic fatty acids and soluble salts thereof, high molecular weight hydrocarbons (e.g., paraffins, haloparaffins, fatty acid esters, fatty acid esters of monovalent alcohols, aliphatic $C_{18}$-$C_{48}$ ketones, etc.), N-alkylated amino triazines, propylene oxide, monostearyl phosphates, silicones or derivatives thereof, secondary alcohols (e.g., 2-alkyl alkanols) and mixtures of such alcohols with silicone oils; (7) suds boosters, such as $C_{10}$-$C_{16}$ alkanolamides, $C_{10}$-$C_{14}$ monoethanol and diethanol amides, high sudsing surfactants (e.g., amine oxides, betaines and sultaines), and soluble magnesium salts (e.g., $MgCl_2$, $MgSO_4$, and the like); (8) fabric softeners, such as smectite clays, amine softeners and cationic softeners; (9) dye transfer inhibiting agents, such as polyvinyl pyrrolidone polymers, polyamine N-oxide polymers, copolymers of N-vinylpyrrolidone and N-vinylimidazole, manganese phthalocyanine, peroxidases, and mixtures thereof; (10) enzymes, such as proteases, amylases, lipases, cellulases, and peroxidases, and mixtures thereof; (11) enzyme stabilizers, which include water-soluble sources of calcium and/or magnesium ions, boric acid or borates (such as boric oxide, borax and other alkali metal borates); (12) bleaching agents, such as percarbonates (e.g., sodium carbonate peroxyhydrate, sodium pyrophosphate peroxyhydrate, urea peroxyhydrate, and sodium peroxide), persulfates, perborates, magnesium monoperoxyphthalate hexahydrate, the magnesium salt of metachloro perbenzoic acid, 4-nonylamino-4-oxoperoxybutyric acid and diperoxydodecanedioic acid, 6-nonylamino-6-oxoperoxycaproic acid, and photoactivated bleaching agents (e.g., sulfonated zinc and/or aluminum phthalocyanines); (13) bleach activators, such as nonanoyloxybenzene sulfonate (NOBS), tetraacetyl ethylene diamine (TAED), amido-derived bleach activators including (6-octanamidocaproyl)oxybenzenesulfonate, (6-nonanamidocaproyl)oxybenzenesulfonate, (6-decanamidocaproyl) oxybenzenesulfonate, and mixtures thereof, benzoxazin-type activators, acyl lactam activators (especially acyl caprolactams and acyl valerolactams); and (14) any other known detergent adjunct ingredients, including but not limited to carriers, hydrotropes, processing aids, perfumes (including both neat perfumes and perfume microcapsules), and solid fillers.

Unitary Laundry Detergent Article

The unitary laundry detergent article of the present invention contains the above-mentioned fabric hueing agent sandwiched between two or more above-mentioned non-fibrous sheets. FIG. 1 is a schematic cross-sectional view of a unitary laundry detergent article 10, which contains a fabric hueing agent 15 sandwiched between two surfactant-containing non-fibrous sheets 12 and 14. The fabric hueing agent 15 can be present in any form as mentioned hereinabove.

Without being bound by any theory, it is believed that such a sandwich structure, i.e., with the surfactant-containing non-fibrous sheets on both sides and the fabric hueing agent in the middle, functions to improve (instead of hinder) dissolution of the fabric hueing agent into the washing liquor during a wash cycle, thereby reducing or eliminating fabric staining or spotting issue typically observed when the fabric hueing agent is provided at a relatively large amount. Further, such a sandwich structure allows a relatively large amount of fabric hueing agent to be incorporated into the finished products in a relatively "invisible" manner, thereby minimizing any negative impact such fabric hueing agent may have upon the overall product appearance.

Figure 2:
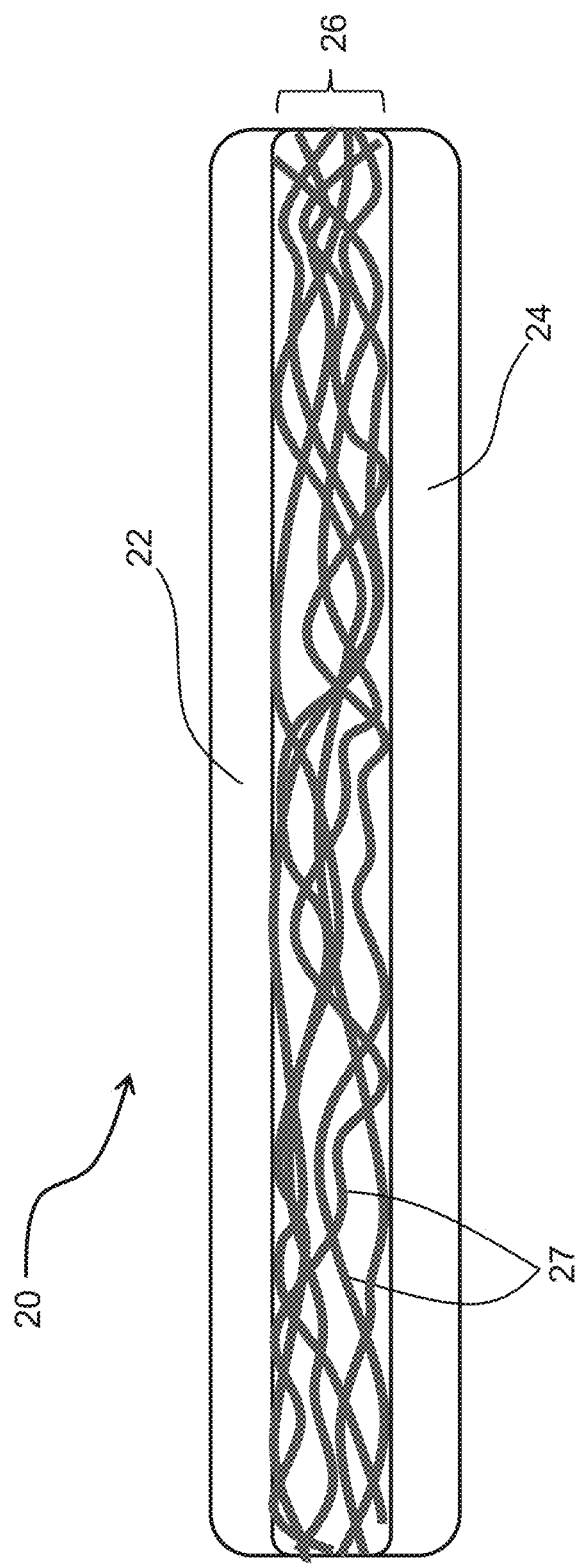
FIG. 2 is a schematic cross-sectional view of a unitary laundry detergent article comprising a fibrous structure sandwiched between two surfactant-containing non-fibrous sheets, while the fibrous structure is formed by a plurality of fibrous element that each contains a fabric hueing agent, according to one embodiment of the present invention.

Preferably, the fabric hueing agent is incorporated into a water-soluble fibrous structure first, which is then disposed between two non-fibrous, surfactant-containing sheets. Such a water-soluble fibrous structure functions to further improve dissolution of the fabric hueing agent, while the non-fibrous, surfactant-containing sheets provide improved structural integrity and better consumer perception of the finished product. FIG. 2 is a schematic cross-sectional view of a unitary laundry detergent article 20, which contains a water-soluble fibrous structure made of a plurality of fibrous elements 27, as sandwiched between two non-fibrous, surfactant-containing sheets 22 and 24. Each of the fibrous elements 27 contains a fabric hueing agent (not shown) as mentioned hereinabove.

The unitary laundry detergent article of the present invention can have any shape or size, and it is preferably a laminar article having: (1) a thickness ranging from about 0.1 mm to about 10 mm, (2) a length-to-thickness aspect ratio of at least about 5:1, and (3) a width-to-thickness aspect ratio of at least about 5:1. Further, it is preferred that the unitary laundry detergent article has a length-to-width aspect ratio of at least about 1:1. Preferably, the length-to-thickness aspect ratio and the width-to-thickness aspect ratio are both at least about 10:1, and the length-to-width aspect ratio is at least about 1.2:1. More preferably, the length-to-thickness aspect ratio and the width-to-thickness aspect ratio are both at least about 15:1, and the length-to-width aspect ratio is at least about 1.5:1. Most preferably, the length-to-thickness aspect ratio and the width-to-thickness aspect ratio are both at least about 20:1, and the length-to-width aspect ratio is at least about 1.618:1. The thickness of the unitary laundry detergent article of the present invention is preferably from about 0.2 mm to about 5 mm, more preferably from about 0.3 mm to about 4 mm, and most preferably from about 0.5 mm to about 2 mm. The width of such article may range from about 2 cm to about 1 meter, preferably from about 5 cm to about 50 cm, more preferably from about 10 cm to about 40 cm. The length of such article may range from about 2 cm to about 50 meters, preferably from about 5 cm to about 1 meter, and more preferably from about 10 cm to about 80 cm.

In a preferred but not necessary embodiment of the present invention, the unitary laundry detergent article of the present invention has a golden rectangular shape (i.e., with a length-to-width aspect ratio of about 1.618:1), and it is characterized by a width of about 10-15 cm and a thickness of about 0.5 mm to about 2 mm. Such a golden rectangular shape is aesthetically pleasing and delightful to the consumers, so multiple articles of such shape can be stacked up and packaged together for sale in a container that is also characterized by a similar golden rectangular shape.

In an alternative embodiment of the present invention, the unitary laundry detergent article has an elongated shape (i.e., with a length-to-width aspect ratio of about 10-50:1), and it is characterized by a width of about 10-15 cm and a thickness of about 0.5 mm to about 2 mm. Such elongated shape allows such an article to be rolled up or folded into a compact unit for easy of packaging, storage, shipment and display.

Preferably, the unitary laundry detergent article of the present invention has certain attributes that render it aesthetically pleasing to the consumers. For example, the article may have a relatively smooth surface (provided by the above-mentioned non-fibrous, surfactant-containing sheets at both sides), thereby providing a pleasant feel when touched by the consumer. Further, it is desirable that such article may have little or no perceivable pores on its surface. It is also desirable that the unitary laundry detergent article of the present invention is strong to withstand substantive mechanical forces without losing its structural integrity, yet at the same time is sufficiently flexible for ease of packaging and storage.

Preferably, the unitary laundry detergent article can be completely dissolved in a liter of deionized water, i.e., leaving no visible residue in the solution, within 15 seconds, more preferably within 10 seconds, and more preferably within 5 seconds, at 20° C. under atmospheric pressure and without any stirring.

The unitary laundry detergent article can be formed by first forming the surfactant-containing non-fibrous sheets and the fabric hueing element (either as it is or incorporated into a structure as described hereinabove) separately, and then assembling them together into a unitary article.

For example, a first formed non-fibrous sheet can be placed on a flat surface, e.g., a conveyor belt, while an already-formed fibrous/non-fibrous/pasty/particulate structure containing the fabric hueing agent can be deposited onto a first planar surface of the first formed non-fibrous sheet. Subsequently, a second formed non-fibrous sheet is placed on top of the fibrous/non-fibrous/pasty/particulate structure, to form a sandwich structure with the fibrous/non-fibrous/pasty/particulate structure disposed between the first and second non-fibrous sheets.

Alternatively, the unitary laundry detergent article can be formed by simultaneously forming and assembling the non-fibrous sheets and the fabric hueing agent together into a unitary article. In such an embodiment, the fabric hueing agent can be directly disposed, in form of either a dry powder or an aqueous solution containing the same, onto one or more non-fibrous sheets as those sheets are being formed, and two or more of such non-fibrous sheets are immediately fed into a continuous roller that will seal them together under pressure and/or heat to form the unitary laundry detergent article of the present invention.

The unitary laundry detergent article of the present invention may further comprise any number of additional layers (either fibrous or non-fibrous) as desired, and such additional layers may or may not contain the fabric hueing agent.

The unitary laundry detergent article so formed can be further processed by heat-pressing or heat-sealing, either along the periphery thereof, or over the entire article, or intermittently at certain sections or regions of such articles, so as to enhance its structural integrity. Still further, the unitary laundry detergent article can be cut into different shapes, embossed, perforated, printed with different colors or graphic patterns, folded, rolled-up, or otherwise packaged in order to improve its aesthetic appeal and user-friendliness.

Correspondingly, the unitary laundry detergent article as mentioned hereinabove can be readily used for pre-treating and/or cleaning fabrics, especially for removing stains and/or odors from fabrics. Preferably, the unitary laundry detergent article of the present invention as mentioned hereinabove is used for pre-treating fabrics before cleaning, which is particularly effective in removing tough stains, such as collar soil, food grease, grass stains, clay or other hard-to-remove soil or dirt. When used for pre-treating and/or cleaning, a section of the fabrics in need of pre-treating and/or cleaning can be first wetted, and then such unitary laundry detergent article, or a piece thereof, can be directly contacted with the wetted section of the fabrics.

The present invention also encompasses a method of laundering using an article according to the present invention, comprising the steps of, placing at least one article according to the present invention into the washing machine along with the laundry to be washed, and carrying out a washing or cleaning operation.

Any suitable washing machine may be used. Those skilled in the art will recognize suitable machines for the relevant wash operation. The unitary laundry detergent article of the present invention may be used in combination with other compositions, such as fabric additives, fabric softeners, rinse aids and the like.

The wash temperature may be 30° C. or less. The wash process may comprise at least one wash cycle having a duration of between 5 and 20 minutes. The automatic laundry machine may comprise a rotating drum, and wherein during at least one wash cycle, the drum has a rotational speed of between 15 and 40 rpm, preferably between 20 and 35 rpm.

Measurement Methods

Various techniques are known in the art to determine properties of the unitary laundry detergent article of the present invention or components thereof. However, the following assays must be used in order that the invention described and claimed herein may be fully understood.

Test 1: Diameter Test Method

The diameter of a discrete fibrous element or a fibrous element within a fibrous structure is determined by using a Scanning Electron Microscope (SEM) or an Optical Microscope and an image analysis software. A magnification of 200 to 10,000 times is chosen such that the fibrous elements are suitably enlarged for measurement. When using the SEM, the samples are sputtered with gold or a palladium compound to avoid electric charging and vibrations of the fibrous element in the electron beam. A manual procedure for determining the fibrous element diameters is used from the image (on monitor screen) taken with the SEM or the optical microscope. Using a mouse and a cursor tool, the edge of a randomly selected fibrous element is sought and then measured across its width (i.e., perpendicular to fibrous element direction at that point) to the other edge of the fibrous element. A scaled and calibrated image analysis tool provides the scaling to get actual reading in µm. For fibrous elements within a fibrous structure, several fibrous element are randomly selected across the sample of the fibrous structure using the SEM or the optical microscope. At least two portions of the fibrous structure are cut and tested in this manner. Altogether at least 100 such measurements are made and then all data are recorded for statistical analysis. The recorded data are used to calculate average (mean) of the fibrous element diameters, standard deviation of the fibrous element diameters, and median of the fibrous element diameters.

Another useful statistic is the calculation of the amount of the population of fibrous elements that is below a certain upper limit. To determine this statistic, the software is programmed to count how many results of the fibrous element diameters are below an upper limit and that count (divided by total number of data and multiplied by 100%) is reported in percent as percent below the upper limit, such as percent below 1 micrometer diameter or %-submicron, for example. We denote the measured diameter (in µm) of an individual circular fibrous element as di.

In the case that the fibrous elements have non-circular cross-sections, the measurement of the fibrous element diameter is determined as and set equal to the hydraulic diameter which is four times the cross-sectional area of the fibrous element divided by the perimeter of the cross-section of the fibrous element (outer perimeter in case of hollow fibrous elements). The number-average diameter, alternatively average diameter is calculated as:

$$d_{num} = \frac{\sum_{i=1}^{n} d_i}{n}$$

Test 2: Median Particle Size Test Method

This test method must be used to determine median particle size of the discrete particles as mentioned hereinabove.

The median particle size test is conducted to determine the median particle size of the seed material using ASTM D 502-89, "Standard Test Method for Particle Size of Soaps and Other Detergents", approved May 26, 1989, with a further specification for sieve sizes used in the analysis. Following section 7, "Procedure using machine-sieving method," a nest of clean dry sieves containing U.S. Standard (ASTM E 11) sieves #8 (2360 um), #12 (1700 um), #16 (1180 um), #20 (850 um), #30 (600 um), #40 (425 um), #50 (300 um), #70 (212 um), #100 (150 um) is required. The prescribed Machine-Sieving Method is used with the above sieve nest. The seed material is used as the sample. A suitable sieve-shaking machine can be obtained from W.S. Tyler Company of Mentor, Ohio, U.S.A.

The data are plotted on a semi-log plot with the micron size opening of each sieve plotted against the logarithmic abscissa and the cumulative mass percent ($Q_3$) plotted against the linear ordinate. An example of the above data representation is given in ISO 9276-1:1998, "Representation of results of particle size analysis—Part 1: Graphical Representation", Figure A.4. The seed material median particle size ($D_{50}$), for the purpose of this invention, is defined as the abscissa value at the point where the cumulative mass percent is equal to 50 percent, and is calculated by a straight line interpolation between the data points directly above (a50) and below (b50) the 50% value using the following equation:

$$D_{50}=10^{\wedge}[\text{Log}(D_{a50})-(\text{Log}(D_{a50})-\text{Log}(D_{b50}))* (Q_{a50}-50\%)/(Q_{a50}-Q_{b50})]$$

where $Q_{a50}$ and $Q_{b50}$ are the cumulative mass percentile values of the data immediately above and below the $50^{th}$ percentile, respectively; and $D_{a50}$ and $D_{b50}$ are the micron sieve size values corresponding to these data.

In the event that the $50^{th}$ percentile value falls below the finest sieve size (150 um) or above the coarsest sieve size (2360 um), then additional sieves must be added to the nest following a geometric progression of not greater than 1.5, until the median falls between two measured sieve sizes.

The Distribution Span of the Seed Material is a measure of the breadth of the seed size distribution about the median. It is calculated according to the following:

$$Span=(D_{84}/D_{50}+D_{50}/D_{16})/2$$

where $D_{50}$ is the median particle size and $D_{84}$ and $D_{16}$ are the particle sizes at the sixteenth and eighty-fourth percentiles on the cumulative mass percent retained plot, respectively.

In the event that the $D_{16}$ value falls below the finest sieve size (150 um), then the span is calculated according to the following:

$$Span=(D_{84}/D_{50}).$$

In the event that the $D_{84}$ value falls above the coarsest sieve size (2360 um), then the span is calculated according to the following:

$$Span=(D_{50}/D_{16}).$$

In the event that the $D_{16}$ value falls below the finest sieve size (150 um) and the $D_{84}$ value falls above the coarsest sieve size (2360 um), then the distribution span is taken to be a maximum value of 5.7.

EXAMPLES

Example 1: Non-Fibrous Sheet Formulations

| Ingredients (wt %) | General | S1 | S2 | S3 | S4 | S5 |
|---|---|---|---|---|---|---|
| $C_{12}$-$C_{14}$ AS | 40-70% | 60% | 70% | 45% | 50% | 48% |
| $C_{12}$-$C_{14}$ LAS | 5-20% | 10% | — | — | — | — |
| $C_{12}$-$C_{14}$ AES* | 0-5% | — | — | — | — | — |
| $C_{16}$-$C_{18}$ MES | 0-30% | — | — | 20% | 20% | — |
| Sodium Alpha-olefin Sulfonate | 0-30% | — | — | — | — | 22% |
| $C_{12}$-$C_{18}$ PKO CAB | 0-8% | — | — | 5% | — | — |
| PVA** | 15-25% | 20% | 20% | 20% | 20% | 20% |
| PEG*** | 0-8% | 5% | — | — | — | — |
| Glycerin | 1-5% | 4% | 6% | 6% | 6% | — |
| Misc.**** & Moisture | 2-10% | Balance | Balance | Balance | Balance | Balance |

*Having an average ethoxylation degree of about 1
**Having a weight average molecular weight (Mw) of about 48000 Daltons.
***Having a weight average molecular weight (Mw) of about 4000 Daltons.
****Including perfume, chelants, and the like.

Example 2: Fabric Hueing Agent-Containing Structures

| Ingredients (wt %) | General | A (Fibers) | B (Sheet) | C (Sheet) | D (Particles) |
|---|---|---|---|---|---|
| Amioca Starch | 0-95% | 90.7% | — | — | — |
| Liquitint Violet 200 | 0-10% | 5.6% | 4% | 6% | 3.8% |
| Dioctyl sulfosuccinate sodium salt | 0-5% | 0.9% | — | — | — |
| Mallic acid | 0-5% | 0.2% | — | — | — |
| Brightener 49 | 0-10% | — | — | 3% | — |
| PVA | 0-50% | — | 20% | 20% | — |
| $C_{12}$-$C_{14}$ AS | 0-80% | — | 60% | 60% | — |
| $C_{12}$-$C_{14}$ LAS | 0-50% | — | 10% | 10% | — |
| Bentonite | 0-80% | — | — | — | 63.84% |
| Sodium sulphate | 0-50% | — | — | — | 27.36% |
| Misc. & Moisture | Balance | Balance | Balance | Balance | Balance |

Example 3: Comparative Test Showing Reduced Fabric Staining/Spotting by Inventive Unitary Laundry Detergent Articles An inventive unitary laundry detergent article is provided, which contains two non-fibrous, surfactant-containing sheets S5 as described in Example 1 with a fabric hueing agent-containing fibrous structure A as described in Example 2 sandwiched therebetween. Each of the non-fibrous sheets S5 has a length of about 5.5 cm, a width of about 5.5 cm, and a thickness of about 0.95 mm, and weighs about 1.5 grams, so the total weight of the non-fibrous sheets is about 3 grams. The fibrous structure A has the same length and width as the non-fibrous sheets S5, but it has a thickness of about 1.2 mm and weighs about 0.5 grams. The fibrous structure A is placed between the non-fibrous sheets S5, which are then sealed together under pressure and heat to form the inventive unitary laundry detergent article of the present invention.

A comparative laundry detergent article is also provided, which contains the same two non-fibrous sheets S5 and the same fabric hueing agent-containing fibrous structure A, but they are not sealed together and remain separate from one another.

Both the inventive laundry detergent article and the comparative laundry detergent article are used for treating fabrics under the following test conditions and procedures:

Test Conditions
  Washing Machine Used: Electrolux W565H;
  Washing Cycle:
    Main Wash—10 mins;
    First Spin—1 min and 35 seconds at about 800 rpm;
    First Rinse: 4 mins;
    Second Spin—1 min and 10 seconds at about 1000 rpm;
    Second Rinse: 4 mins;
    Third Spin—1 min and 10 seconds at 1000 rpm.
  Water Supply: Beijing city water,
  Water Level: about 13 L for both the main wash & rinses;
  Fabric Load Size and Type:
    Thirteen (13) white ballast fabric pieces with a fabric size of 50 cm*50 cm each and a total weight of about 1.7 kg;
    Containing 60% cotton and 40% of a polyester and cotton blend at a 50/50 ratio.

Test Procedure:
1. Rinse the washing machine using the 4-min rinse cycle twice before each test;
2. Put the inventive or comparative test sample at the bottom of the washing tub of the washing machine;
3. Put one piece of cotton ballast fabric flat on top of the inventive or comparative test sample;
4. Put the other ballast fabrics loosely into the washing tub;
5. Close the door of washing machine and start washing cycle;

6. After one washing cycle is finished, open the door and take the ballast out;
7. Line dry the ballast overnight in a drying room at about 22° C.;
8. Collect the dried fabric ballast on the next morning for spotting evaluation;
9. Use a single lens reflex camera (which is zoomed into a 10 cm*10 cm frame size) to take pictures of any stained/spotted areas on the white fabric pieces under the same light source and at the same distance;
10. Use an image analysis tool to quantify the Spotting Intensity, which is calculated as the percentage (%) of spotted area on the treated fabrics divided by the total frame area of the fabric pictures taken.

The test results are as follows:

| Test Sample | Spotting Intensity (%) |
|---|---|
| Inventive Laundry Detergent Article | 0.000779* |
| Comparative Laundry Detergent Article | 15.20** |

*There are a total of 10 stained/spotted fabric pieces among a total of 52 fabric pieces treated by the inventive article (i.e., 13 fabric piece per test with 4 replication of the test). Images of the stained/spotted areas on each fabric piece are captured by the single lens reflex camera which is zoomed into a 10 cm*10 cm frame size, and the image is then analyzed to calculate the spotting intensity.
**There are a total of 11 stained/spotted fabric pieces among a total of 52 fabric pieces treated by the comparative article (i.e., 13 fabric piece per test with 4 replication of the test). Images of the stained/spotted areas on each fabric piece are captured by the single lens reflex camera which is zoomed into a 10 cm*10 cm frame size, and the image is then analyzed to calculate the spotting intensity.

Although the inventive laundry detergent article and the comparative laundry detergent article result in similar numbers of stained/spotted fabric pieces, spotting on the fabric pieces treated by the comparative laundry detergent article is much more severe than those treated by the inventive laundry detergent article of the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A unitary laundry detergent structure comprising two or more non-fibrous sheets and at least one fabric hueing agent present in a water-soluble fibrous structure disposed between said two or more non-fibrous sheets, wherein said unitary laundry detergent structure is water-soluble, wherein each of said two or more non-fibrous sheets comprises at least one film former and a first surfactant.

2. The unitary laundry detergent structure of claim 1, wherein each of said two or more non-fibrous sheets has a thickness ranging from 0.1 mm to 10 mm, a length-to-thickness aspect ratio of at least 5:1, and a width-to-thickness aspect ratio of at least 5:1.

3. The unitary laundry detergent structure according to claim 1, wherein said water-soluble fibrous structure comprises a plurality of fibrous elements that each comprises from 0.01% to 30%, of the fabric hueing agent by total dry weight of said each fibrous element.

4. The unitary laundry detergent structure of claim 3, wherein the plurality of fibrous elements each comprise from 0.5% to 10% of the fabric hueing agent by total dry weight of said each fibrous element.

5. The unitary laundry detergent structure of claim 3, wherein each of said fibrous element further comprises from 30% to 70% of a filament-forming material by total dry weight of said each fibrous element, and wherein said filament-forming material is selected from the group consisting of polyvinyl alcohols, starch, cellulosic polymers, polyethylene oxides, and combinations thereof.

6. The unitary laundry detergent structure according to claim 1, wherein said at least one fabric hueing agent is selected from the group consisting of dyes, dye-clay conjugates, organic pigments, inorganic pigments, optical brighteners, and combinations thereof.

7. The unitary laundry detergent structure of claim 1, wherein the at least one fabric hueing agent is a fabric hueing dye selected from the group consisting of direct dyes, basic dyes, reactive dyes, solvent dyes, disperse dyes, and combinations thereof.

8. The unitary laundry detergent structure according to claim 1, wherein said fabric hueing agent has a chemical structure of:
(a)

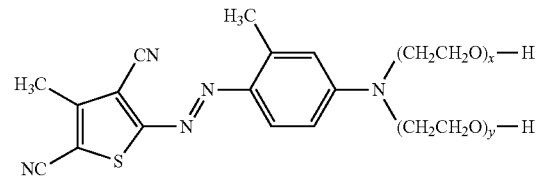

wherein the index values x and y are independently selected from 1 to 10; or (b)

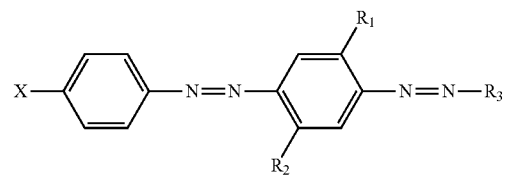

wherein: $R_1$ and $R_2$ are independently selected from the group consisting of:
H; alkyl; alkoxy; alkyleneoxy; alkyl capped alkyleneoxy; urea; and amido; $R_3$
is a substituted aryl group; X is a substituted group comprising sulfonamide moiety and optionally an alkyl and/or aryl moiety, and wherein the substituent group comprises at least one alkyleneoxy chain that comprises an average molar distribution of at least four alkyleneoxy moieties.

9. The unitary laundry detergent structure according to claim 1, wherein said fabric hueing agent is an optical brightener selected from the group consisting of diaminostilbenes, distyrylbiphenyls, and combinations thereof.

10. The unitary laundry detergent structure of claim 9, wherein said optical brightener is selected from the group consisting of: disodium 4,4'-bis {[4-anilino-6-morpholino-s-triazin-2-yl]-amino}-2,2'-stilbenedisulfonate; disodium 4,4'-bis[(4,6-di-anilino-s-triazin-2-yl)-amino]-2,2'-stilbenedisulfonate; disodium 4,4'-bis {[4-anilino-6-[bis(2-hydroxyethyl)amino-s-triazin-2-yl]-amino}-2,2'-stilbenedisulfonate; disodium 2,2'-([1,1'-biphenyl]-4,4'-diyldi-2,1-ethenediyl) bis-benzenesulfonate; and combinations thereof.

11. The unitary laundry detergent structure according to claim 1, wherein each of said two or more non-fibrous sheets comprises: from 30% to 90%, of said first surfactant by total weight of said each non-fibrous sheet, and from 10% to 40% of said at least one film former by total weight of said each non-fibrous sheet, and wherein preferably the first surfactant is present as the main surfactant in each of said two or more non-fibrous sheets.

12. The unitary laundry detergent structure according to claim 1, wherein said first surfactant in said two or more non-fibrous sheets is characterized by a Hydrophilic Index (HI) of no more than 7.5.

13. The unitary laundry detergent structure according to claim 1, wherein said at least one film former in each of said two or more non-fibrous sheets is a water-soluble polymer selected from the group consisting of polyvinyl alcohols, polyalkylene glycols, starch or modified starch, cellulose or modified cellulose, polyacrylates, polymethacrylates, polyacrylamides, polyvinylpyrrolidones, and combinations thereof.

14. The unitary laundry detergent structure according to claim 1, wherein said at least one film former in each of said two or more non-fibrous sheets is a polyvinyl alcohol characterized by a weight average molecular weight ranging from 15,000 to 120,000 Daltons; and a degree of hydrolysis ranging from 70% to 92%.

\* \* \* \* \*